(12) United States Patent
Ibusuki et al.

(10) Patent No.: US 8,867,178 B2
(45) Date of Patent: Oct. 21, 2014

(54) READ SENSOR WITH A HARD BIAS LAYER HAVING A HIGH STATIC FIELD RESISTANCE

(71) Applicant: HGST Netherlands B.V., Amsterdam (NL)

(72) Inventors: Takahiro Ibusuki, Tokyo (JP); Hideki Mashima, Odawara (JP); Yuta Udo, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/653,301

(22) Filed: Oct. 16, 2012

(65) Prior Publication Data
US 2014/0104723 A1     Apr. 17, 2014

(51) Int. Cl.
*G11B 5/39* (2006.01)

(52) U.S. Cl.
USPC ................................... 360/324.12

(58) Field of Classification Search
CPC ......... G11B 5/3932; G11B 5/398; G11B 5/39
USPC ................................... 360/324.12
See application file for complete search history.

(56) References Cited

U.S. PATENT DOCUMENTS

| | | | |
|---|---|---|---|
| 4,972,284 A * | 11/1990 | Smith et al. | 360/327.1 |
| 7,229,706 B2 | 6/2007 | Hasegawa et al. | |
| 7,333,305 B2 * | 2/2008 | Gill | 360/324.12 |
| 7,446,987 B2 | 11/2008 | Zhang et al. | |
| 7,515,388 B2 | 4/2009 | Zhang et al. | |
| 7,652,857 B2 | 1/2010 | Sato | |
| 7,672,087 B2 | 3/2010 | Kanaya et al. | |
| 8,031,442 B2 * | 10/2011 | Pinarbasi | 360/324.1 |
| 2001/0043448 A1 * | 11/2001 | Iwasaki et al. | 360/324.12 |
| 2002/0012209 A1 * | 1/2002 | Ajiki et al. | 360/327.3 |
| 2005/0280959 A1 * | 12/2005 | Guo et al. | 360/324.12 |
| 2006/0279881 A1 * | 12/2006 | Sato | 360/324.12 |
| 2007/0217086 A1 * | 9/2007 | Matsubara et al. | 360/324.12 |

(Continued)

FOREIGN PATENT DOCUMENTS

| | | | |
|---|---|---|---|
| JP | 08077517 A | * | 3/1996 |
| JP | 11039615 A | * | 2/1999 |
| JP | 11120524 A | * | 4/1999 |

OTHER PUBLICATIONS

Marrows et al., "Canted exchange bias in antiparallel biased spin valves," 2000 American Institute of Physics, Journal of Applied Physics, vol. 87, No. 9, May 1, 2000, pp. 5058-5060.

*Primary Examiner* — Will J Klimowicz
(74) *Attorney, Agent, or Firm* — Zilka-Kotab, PC

(57) ABSTRACT

In one embodiment, a magnetic sensor comprises a read element and a magnetic-domain-control film positioned on both sides of the read element in a cross-track direction. The magnetic-domain-control film has a flare shape which causes the magnetic-domain-control film to flare away in an element height direction from the depthwise end of read element and extending in both directions away from the read element in a cross-track direction. In another embodiment, a method for forming a magnetic sensor includes forming a read element and forming a magnetic-domain-control film positioned on both sides of the read element in a cross-track direction, wherein the magnetic-domain-control film has a flare shape which causes the magnetic-domain-control film to flare away from the depthwise end of read element extending in both directions in a cross-track direction.

19 Claims, 10 Drawing Sheets

(56) References Cited

U.S. PATENT DOCUMENTS

| | | |
|---|---|---|
| 2008/0062573 A1 | 3/2008 | Tatewaki |
| 2008/0068761 A1* | 3/2008 | Horiguchi et al. ............ 360/313 |
| 2009/0161269 A1 | 6/2009 | Freitag et al. |
| 2010/0142100 A1 | 6/2010 | Yoshida et al. |
| 2011/0007426 A1* | 1/2011 | Qiu et al. ...................... 360/313 |
| 2011/0116195 A1* | 5/2011 | Cazacu et al. ................ 360/319 |
| 2011/0198314 A1* | 8/2011 | Wang et al. ..................... 216/22 |
| 2011/0215800 A1 | 9/2011 | Zhou et al. |
| 2013/0083432 A1* | 4/2013 | Le et al. ..................... 360/235.4 |
| 2013/0163121 A1* | 6/2013 | Le et al. ..................... 360/235.4 |

* cited by examiner

READ SENSOR WITH A HARD BIAS LAYER HAVING A HIGH STATIC FIELD RESISTANCE

FIELD OF THE INVENTION

The present invention relates to a read sensor, and more particularly, to a magnetoresistive sensor employed as an angle sensor, an orientation sensor, or an encoder in a magnetoresistive device.

BACKGROUND

Magnetoresistive sensors typically comprise a magnetization free layer and a magnetization fixed layer (pinned layer). The free layer is responsive to a magnetic field that is produced as a signal from a magnetic medium. The electrical resistance of the sensor depends on the angle between free layer and the pinned layer. Therefore, the resistance is varied according to the angle between the free layer and the pinned layer. The electrical resistance is read as a signal. When the magnetization free layer moves irregularly with respect to the signal magnetic field there will be noise or a sensing failure, and the reliability of the sensing device is decreased. In some devices, the magnetization free layer may be stabilized using a magnetic-domain-control field which is generated by a magnetic-domain-control film comprising a hard magnetic material. The hard magnetic material may be an alloy comprising Co or Fe, or an alloy thereof, along with Pt.

However, the magnetic charge at the ends of the magnetic-domain-control film generates the magnetic-domain-control field for stabilizing the free layer, on the other hand, so a large opposing magnetic field may be generated in the magnetic-domain-control film itself. This may result in the magnetization at the ends of the magnetic-domain-control film to be unstable, and the magnetization at the ends may cause an unstable magnetization. If demagnetization occurs after the magnetoresistive device has been shipped, there is a risk that the device may experience a malfunction. Therefore, there is a need to provide further stabilization in the magnetic-domain-control film in order to lessen the effect of the magnetic charge at the ends of the magnetic-domain-control film.

The problem of instability in conventional magnetic-domain-control films is due to the charge at the ends of the magnetic-domain-control film. The shape of current magnetic-domain-control films in the region of the element is a right-angle on the air bearing surface (ABS) side and a side opposite the ABS side, and the magnetic charge readily accumulates in the corners on the ABS side and the opposite side. Furthermore, the corners at the ends of the magnetic-domain-control film on the ABS side and the opposite side are also regions where there should be nucleation sites for magneto-switching, and there is a strong effect from the demagnetizing field.

It has been difficult to lessen the effect of the magnetic charge which accumulates in the corners in conventional magnetic-domain-control films. Accordingly, it would be beneficial to have a more stable magnetic-domain-control film which restricts magnetic charge accumulation in the corners at the ends of the magnetic-domain-control film on the ABS side and the opposite side.

SUMMARY

In one embodiment, a magnetic sensor comprises a read element and a magnetic-domain-control film positioned on both sides of the read element in a cross-track direction. The magnetic-domain-control film has a flare shape which causes the magnetic-domain-control film to flare away in an element height direction from a depthwise end of the read element and extending in both directions away from the read element in a cross-track direction.

In another embodiment, a method for forming a magnetic sensor includes forming a read element and forming a magnetic-domain-control film positioned on both sides of the read element in a cross-track direction, wherein the magnetic-domain-control film has a flare shape which causes the magnetic-domain-control film to flare away in an element height direction from a depthwise end of the read element and extending in both directions away from the read element in a cross-track direction.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic sensor comprises a read element and a magnetic-domain-control film positioned on both sides of the read element in a cross-track direction. The magnetic-domain-control film has a flare shape which causes the magnetic-domain-control film to flare away in an element height direction from a depthwise end of the read element and extending in both directions away from the read element in a cross-track direction.

In another general embodiment, a method for forming a magnetic sensor includes forming a read element and forming a magnetic-domain-control film positioned on both sides of the read element in a cross-track direction, wherein the magnetic-domain-control film has a flare shape which causes the magnetic-domain-control film to flare away in an element height direction from a depthwise end of the read element and extending in both directions away from the read element in a cross-track direction.

Figure 1A:
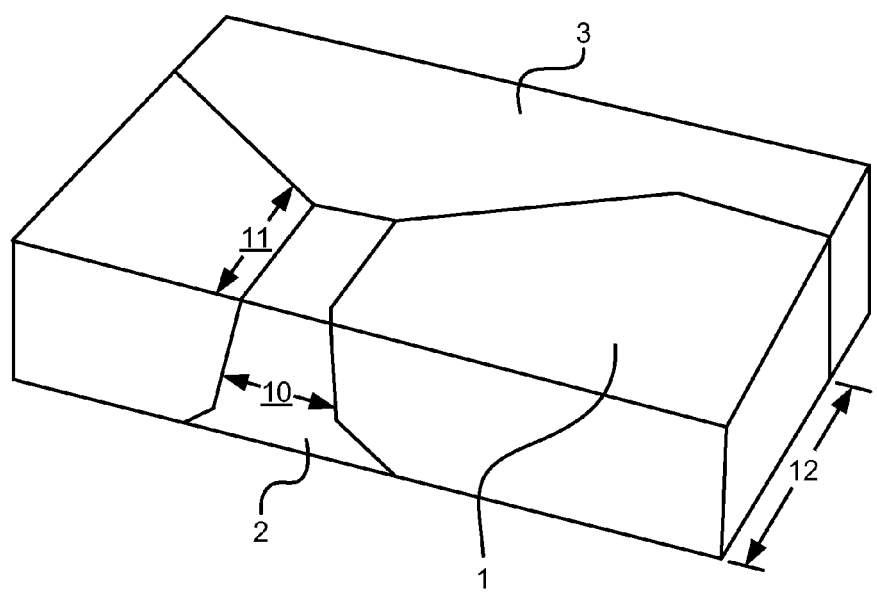
FIGS. 1A-1B show an isometric view and a top view, respectively, of a read element portion of a magnetic head, according to one embodiment.
Figure 1B:
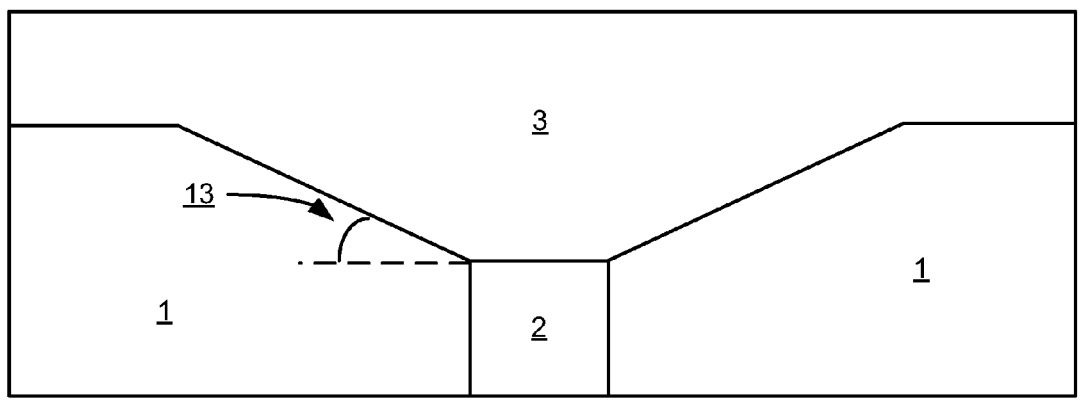

According to one embodiment, as shown in FIGS. 1A-1B, a magnetic-domain-control film 1 may have an obtuse-angle shape in a region of an element 2 having a width 10 on an air bearing surface (ABS) side and a side opposite the ABS side toward an insulating film 3 so as to impart a narrowed structure at ends of the magnetic-domain-control film 1. As a result, it is possible to provide a magnetic-domain-control film 1 in which the influence of the magnetic charge at the ends of the magnetic-domain-control film 1 on the ABS side and the opposite side is lessened, and the magnetization at the ends of the magnetic-domain-control film 1 is more stable than in a conventional structure.

By adopting embodiments described herein, external magnetic field resistance may be improved by around 1.5 times compared to a conventional structure.

Figure 2A:
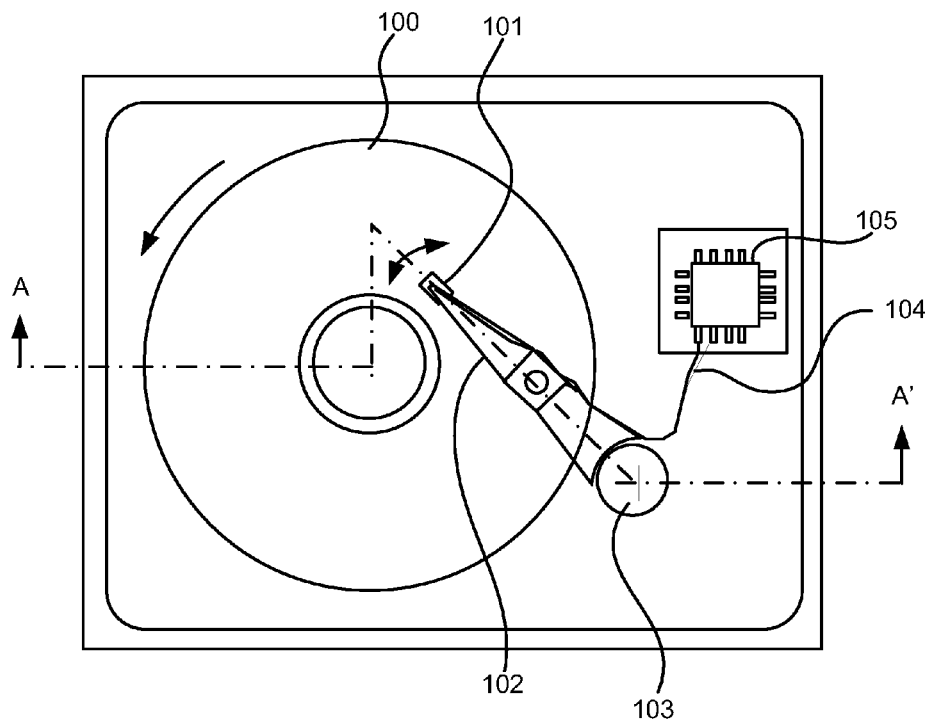
FIGS. 2A-2B show schematic diagrams of a hard disk drive, according to one embodiment.
Figure 2B:
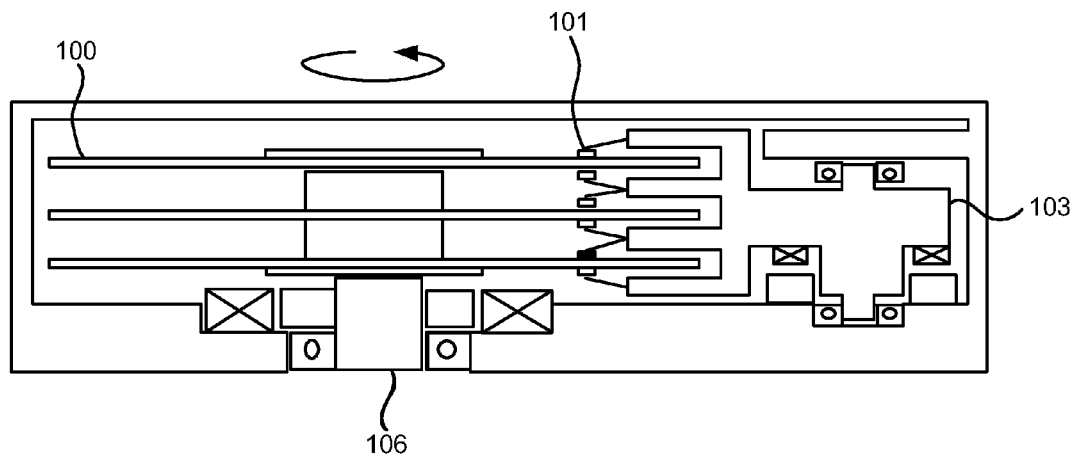

According to a first exemplary embodiment, production of a magnetic sensor that has a magnetic-domain-control film having a flared shape is described. FIGS. 2A-2B show a magnetic data storage system, and specifically a hard disk drive, which comprises a magnetic recording medium 100, a head gimbal assembly (HGA) comprising a magnetic head 101 for writing to/reading from the medium and a suspension 102, a read/write integrated circuit (IC) 105, and a mechanical control mechanism (not numbered). The mechanical control mechanism comprises an actuator 103 for adjusting the position of the magnetic head, and a spindle motor 106 for rotating the recording medium.

Furthermore, the magnetic data storage system may comprise at least one magnetic head 101 which includes a magnetic sensor as described herein according to any embodiment, a magnetic medium 100, a drive mechanism for passing the magnetic medium over the at least one magnetic head, and a controller 105 electrically coupled to the at least one magnetic head for controlling operation of the at least one magnetic head.

Figure 3:
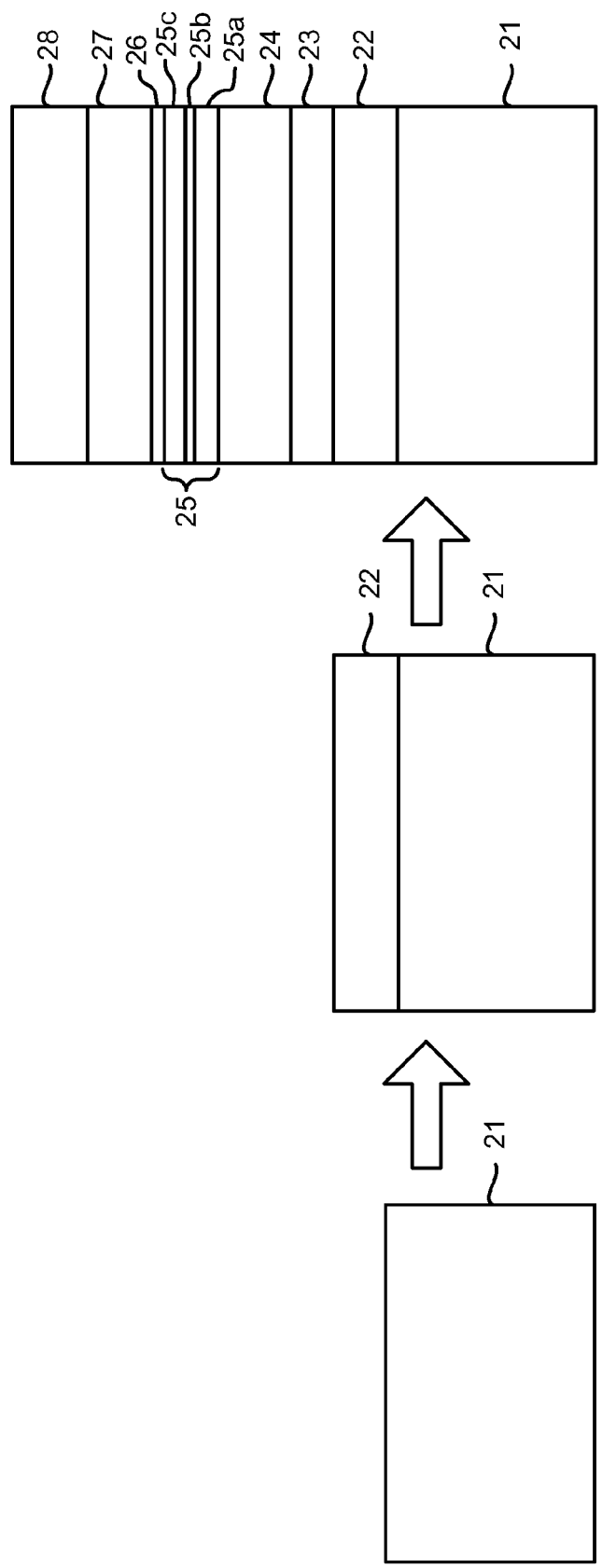
FIG. 3 shows a read element film formation process, according to one embodiment.
Figure 4:
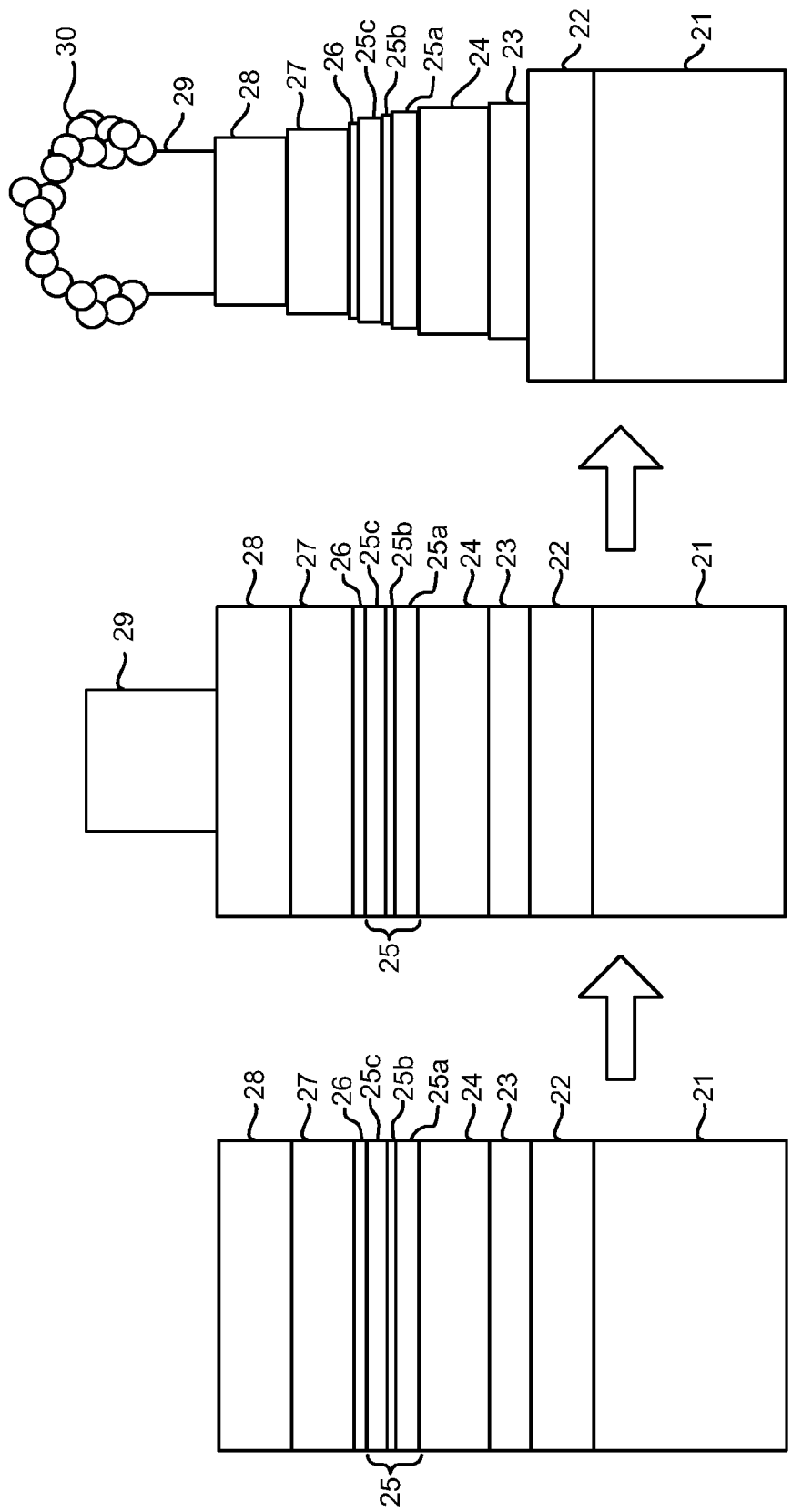
FIG. 4 shows a track width formation process, according to one embodiment.
Figure 5:
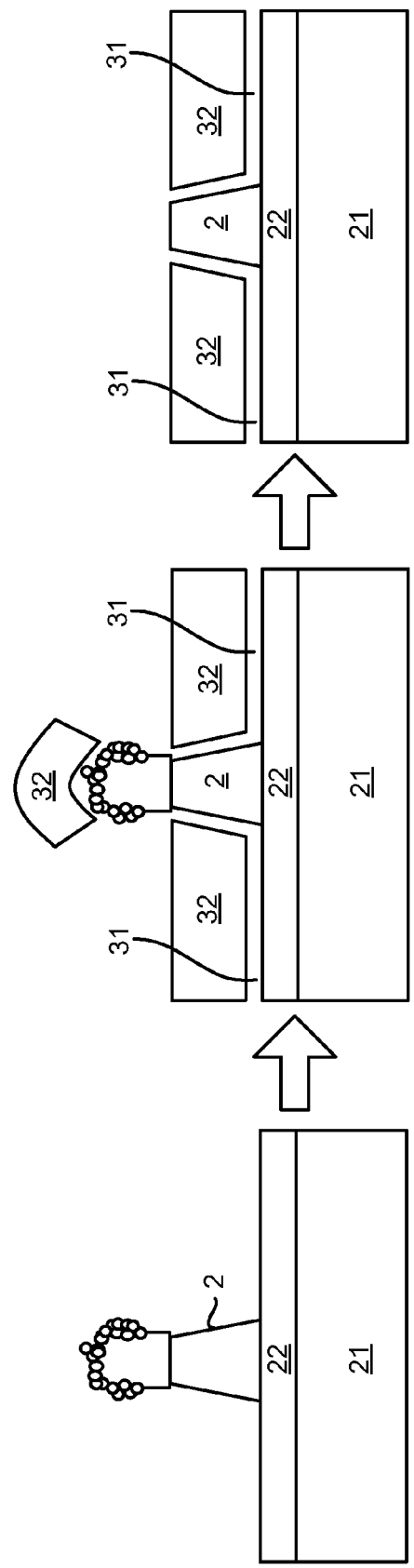
FIG. 5 is a magnetic-domain-control film formation process, according to one embodiment.

The embodiments described herein focus on the portion of the read element of the magnetic head. FIGS. 3-5 illustrate a method for forming a read element of a magnetic head, where FIG. 3 is a schematic view in cross section of a film formation process, FIG. 4 is a schematic view in cross section of an ion milling process, and FIG. 5 is a schematic view in cross section of an embedding process. It should be noted that FIGS. 3-5 are all schematic views in cross section when viewed from the ABS side of the magnetic head.

All dimensions described in relation to the various figures are for example only, and exemplary ranges have been provided in some instances. However, even when a range is not specified, it should be noted that dimensions similar to those described may be used in further embodiments.

First, as shown in FIG. 3, an AlO film (not depicted) is formed on a substrate 21 of a nonmagnetic body, such as an AlTiC substrate which forms a slider, and a lower magnetic shield layer 22 comprising NiFe or a comparable material comprising Ni, Co, Fe, etc., is formed above the substrate to a thickness on the order of about 2 µm to about 3 µm. After these films have been formed, the following steps are carried out in order to form a lower shield: resist coating, shield-shape exposure, milling, insulating film formation, resist removal, and chemical-mechanical planarization (CMP).

The lower magnetic shield layer 22 has a magnetic shielding function, and also functions as a lower terminal of the read element, in various embodiments. The read element is formed on this type of lower magnetic shield layer. The layers which form the read element are formed using sputtering or some other suitable method of deposition.

An underlayer 23 is formed above the lower magnetic shield layer 22. The underlayer 23 comprises a Ta 2/Ru 2 (nm) laminated film, a Ta 0.5/CoFeTaB 2/Ru 1 (nm) laminated film, a Ta 0.4/NiFe 2/Ru 0.5 (nm) laminated film, or some other suitable laminated or non-laminated film.

An antiferromagnetic layer 24 is then formed above the underlayer 23 to a thickness of about 5 nm, for example. The antiferromagnetic layer 24 comprises an IrMn film, PtMn film, PdPtMn film, or some other suitable material.

A CoFe film having a thickness of about 1.0-2.0 nm, such as about 1.5 nm, is then formed on the antiferromagnetic layer 24 as a first ferromagnetic layer 25a, a Ru film having a thickness of about 0.4-1.0 nm, such as about 0.7 nm, is then formed thereon as an interlayer coupling layer 25b, and a CoFeB film having a thickness of about 1.0-3.0 nm, such as about 2.0 nm, is formed thereon as a second ferromagnetic layer 25c. The first ferromagnetic layer 25a, interlayer coupling layer 25b, and second ferromagnetic layer 25c form a magnetization fixed layer 25.

A MgO film having a thickness of about 0.5-2.0 nm, such as about 1.0 nm, is then formed above the magnetization fixed layer 25 as a tunnel barrier layer 26, and a CoFeB 1.8/Ta 0.2/NiFe 3 (nm) laminated film is formed thereon as a magnetization free layer 27. The following layers are then stacked in this order: underlayer 23, antiferromagnetic layer 24, magnetization fixed layer 25, tunnel barrier layer 26, magnetization free layer 27, and protective layer 28, thereby forming a tunnel magnetoresistance (TMR) film shown in FIG. 3, according to one embodiment.

The TMR film is annealed for about 2 to 4 hours, such as about 3 hours, at a temperature of about 200-350° C., such as about 280° C., under a magnetic field of about 3-7 T, such as about 5 T, for example, in order to induce an exchange coupling field between the antiferromagnetic layer 24 and the first ferromagnetic layer 25a.

A Twr resist mask 29 having a predetermined shape is formed above the TMR film using a photoresist process, such as that shown in FIG. 4, in one embodiment. Ion milling is carried out until the lower magnetic shield layer 22 is exposed, and a read element shape in the track width direction is formed. This processing determines the shape of the read element 2 in the track width direction.

After the processing, as shown in FIG. 5, according to one embodiment, an insulating film 31 having a thickness of about 2-5 nm, such as about 4 nm, is formed over the whole surface of the lower magnetic shield layer 22 using any deposition technique known in the art, such as ion beam deposition (IBD) while the resist mask is left in place. After formation of the insulating film 31, a Ta 1 nm/CrMo 2 (nm) film, for example, is formed using IBD or some other suitable formation technique on the insulating film 31 as an underlayer, cobalt/chromium/platinum (CoCrPt) is deposited, and a magnetic-domain-control film 32 is formed on both sides of the read element 2 with the insulating film 31 interposed. The Twr resist mask 29 is then removed, and the insulating film 31 and magnetic-domain-control film 32 on the upper surface of the cap layer 28 are lifted off. After the surface of the magnetic-domain-control film 32 has been planarized, e.g., by a chemical-mechanical planarization (CMP) process, the shape in the element height direction and the flare shape of the magnetic-domain-control film are then formed.

Figure 6:
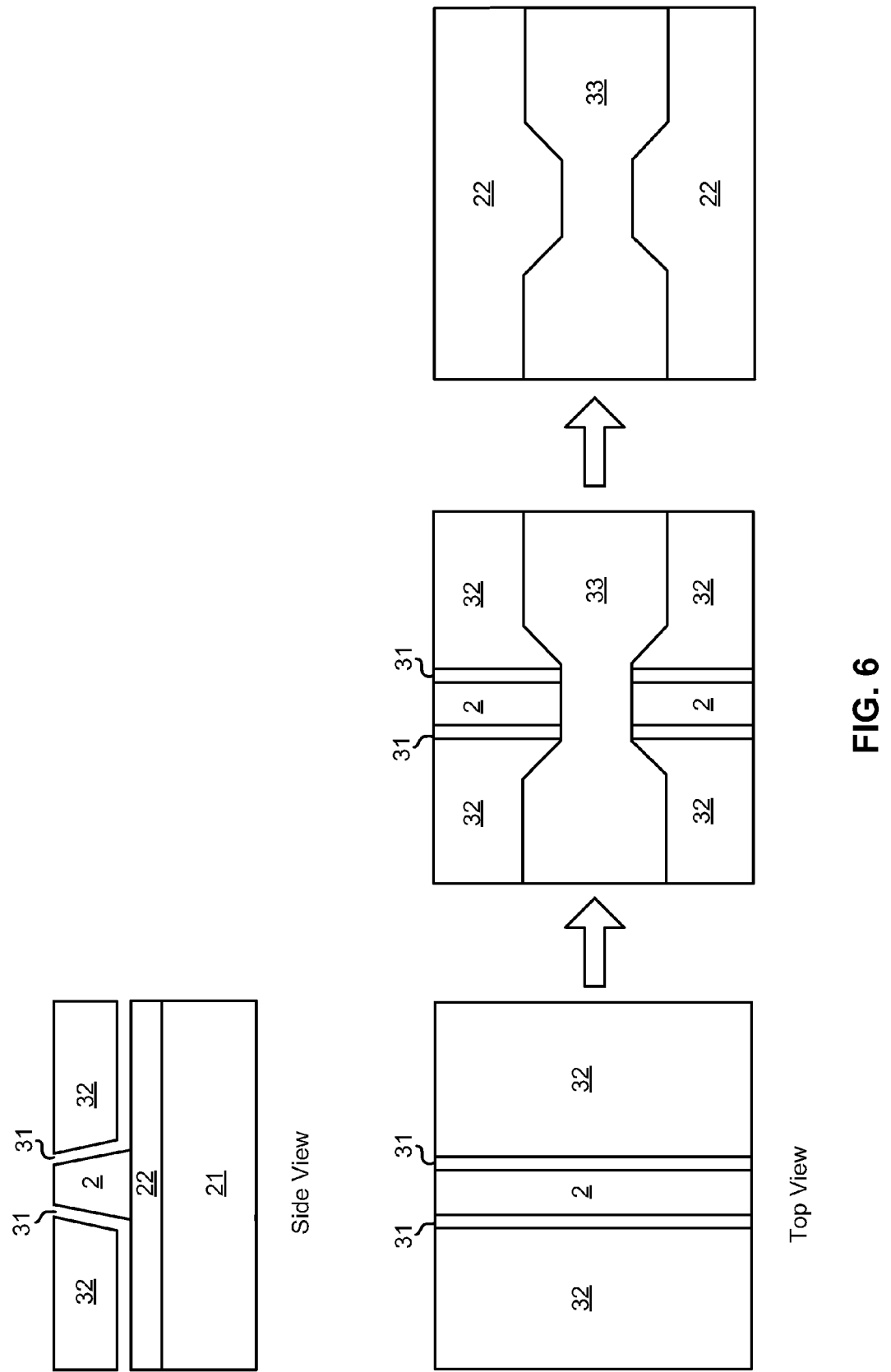
FIG. 6 shows an element height and magnetic-domain-control film height direction formation process, according to one embodiment.

As shown in FIG. 6, according to one embodiment, a height resist mask 33 having a predetermined shape is formed, and ion milling is carried out until the lower shield layer 22 is exposed, according to one embodiment. Using this process, the depthwise shape of the read element 2 and the flare structure of the magnetic-domain-control film are formed. After this processing, an insulating film is formed and the height resist mask 33 is lifted off. The surfaces of the read element 2 and the magnetic-domain-control film 32 are once again planarized, after which an upper magnetic shield layer comprising NiFe or other suitable material is formed to a thickness of about 2 μm-3 μm on the read element 2 and the magnetic-domain-control film 32. The upper magnetic shield layer functions as magnetic shielding and also functions as the upper terminal of the read element 2, according to one embodiment.

The processes described up to this point complete a basic structure of a write head having a magnetic-domain-control film with a flare shape. After this, the read element may be processed, but this is not described in detail. After formation of the read element, the head may be referred to as a magnetic head having both read and write elements.

In the magnetic head 101 formed according to one embodiment, the magnetization direction of the magnetization free layer 27 varies according to the magnetic field based on data recorded to the magnetic recording medium, and as a result, the resistance value of the read element 2 varies. Data recorded on the magnetic recording medium is read by electrical detection of these variations in the resistance value.

In one exemplary embodiment, a method for forming a magnetic sensor comprises forming a read element and forming a magnetic-domain-control film positioned on both sides of the read element in a cross-track direction. Any formation technique may be used to form either layer, such as those described herein and others known in the art. The magnetic-domain-control film has a flare shape which causes the magnetic-domain-control film to flare away in an element height direction from the depthwise end of the read element and extending in both directions away from the read element in a cross-track direction.

Specifically, the flare shape causes portions of the magnetic-domain-control film positioned farther from the read element to have a greater height in an element height direction than portions of the magnetic-domain-control film positioned nearer to the read element.

Furthermore, in one embodiment, the flare shape, on both sides of the read element in a cross-track direction, may comprise an end portion of the magnetic-domain-control film, that has a depthwise end that is about parallel with a depthwise end of the read element and a flared end portion of the magnetic-domain-control film, extending between the end portion and the read element, that has a depthwise end that is angled relative to the depthwise end of the read element.

In another embodiment, the flare shape, on both sides of the read element in a cross-track direction, may comprise a starting portion of the magnetic-domain-control film, positioned adjacent the read element, that has a depthwise end that is about parallel with a depthwise end of the read element, an end portion of the magnetic-domain-control film that has a depthwise end that is about parallel with the depthwise end of the read element, and a flared end portion of the magnetic-domain-control film, extending between the starting portion and the end portion, that has a depthwise end that is angled relative to the depthwise end of the read element.

Figure 7A:
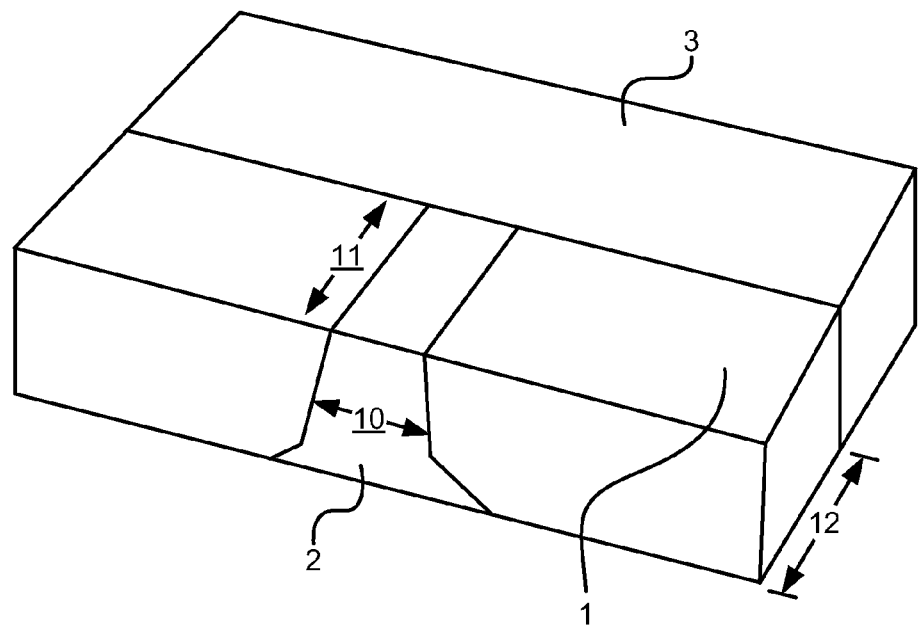
FIG. 7A shows a schematic diagram of a conventional magnetic-domain-control film according to the prior art.

In the conventional structure shown in FIG. 7A, the magnetic-domain-control film 1 height hPM 12 and the read element 2 height SH 11 are matching. However, the height hPM 12 of the magnetic-domain-control film 1 having a flare angle 13 shown in FIG. 7B, according to a second exemplary embodiment, may be formed at any length. But, the external magnetic field resistance in the Twr direction largely depends on the magnetic-domain-control film 1 height hPM 12. A conventional element is produced with a different hPM by varying the shape of the height resist mask and the upper limit for hPM is determined.

Figure 8:
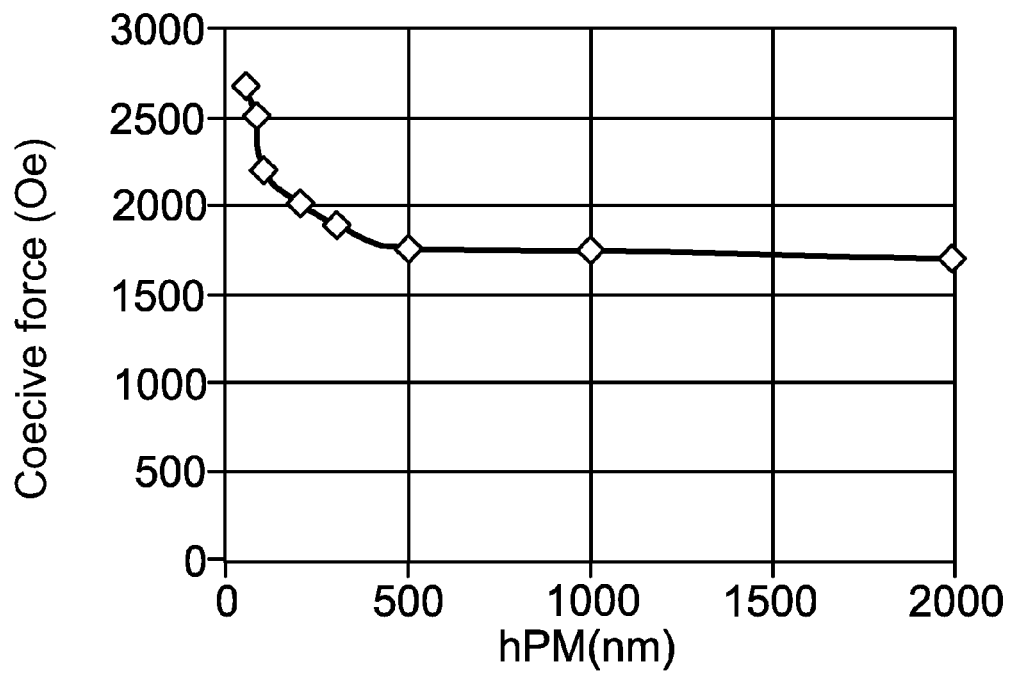
FIG. 8 is a graph showing magnetic-domain-control film height and external magnetic film resistance, according to one embodiment.

FIG. 8 shows a magnetic field at the start of fluctuation of an element with the weakest external magnetic field resistance in the Twr direction with respect to the magnetic-domain-control film height hPM. The magnetic field resistance improves as hPM becomes shorter, and substantially reaches a maximum when hPM is about 100 nm or less. 100 nm is almost twice the value of the read element height SH 11, and therefore the upper limit for hPM may be about twice the read element height SH, according to one embodiment.

Figure 9:
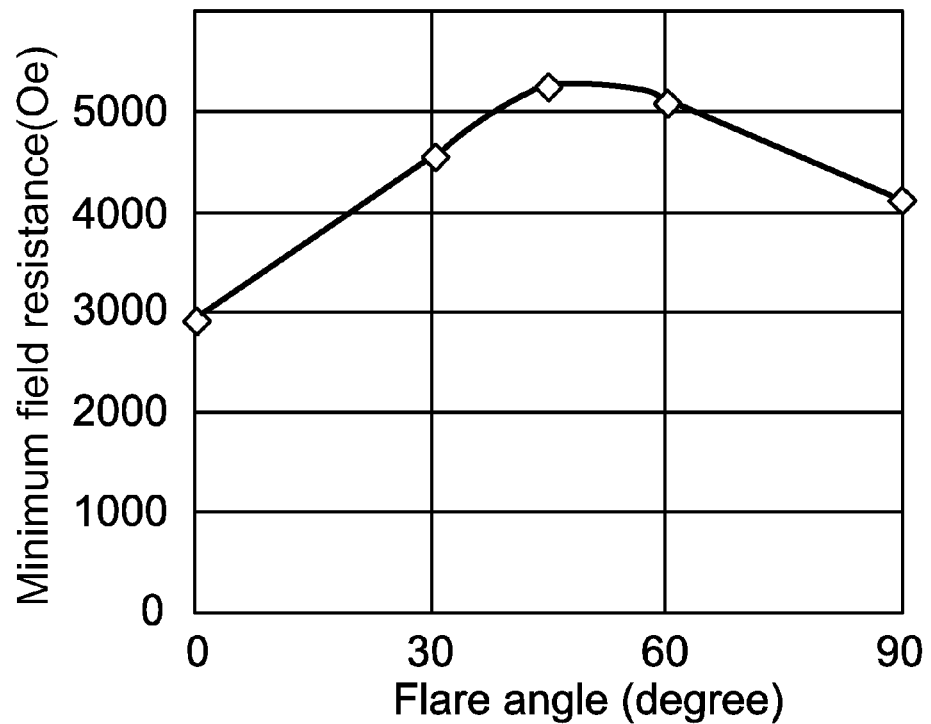
FIG. 9 is a graph showing a flare angle formed at the end of the magnetic-domain-control film, and external magnetic field resistance, according to one embodiment.

In a third exemplary embodiment, attention is paid to a flare angle of a magnetic-domain-control film having a flared shape, along with magnetic field resistance. It is possible to form a magnetic-domain-control film having various flared shapes by varying the shape of the height resist mask, and the flare angle and magnetic field resistance are described herein in FIG. 9, according to one embodiment. FIG. 9 shows the flare angle and magnetic field when fluctuation has started to occur in the characteristics of an element with the weakest external magnetic field resistance.

When the flare angle is about 30° to about 60°, the magnetic field resistance is determined to be about 1.3-1.5 times greater than in the case of a flare angle of 0° or 90°, which does not have a narrowed structure. It is seen from FIG. 9 that the magnetic field resistance is improved by adopting a magnetic-domain-control film structure having a flare angle. It also may be judged that a flare angle of about 30°-60° is a more effective angle among the many possible flare angles, in some approaches.

Figure 10:
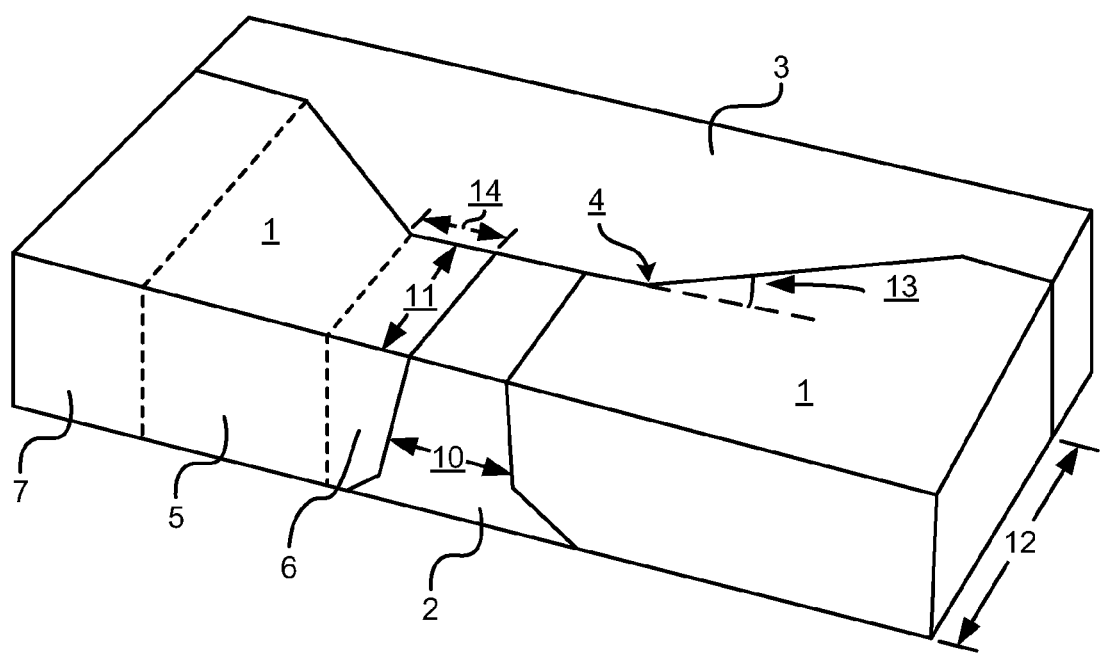
FIG. 10 shows an isometric view of a read element portion of a magnetic head, according to one embodiment.

In a fourth exemplary embodiment, a flare start position and magnetic field resistance are analyzed. FIG. 10 shows another embodiment of a read element portion of a magnetic head. The flare start position is ideally near an end of the read element, but it is necessary to take account of the positional offset of the height resist mask 33 shown in FIG. 6, in one approach. The positional offset may be ±20 nm, approximately, and therefore the start position may be offset by a maximum of about 40 nm to one side, in one approach.

Figure 11:
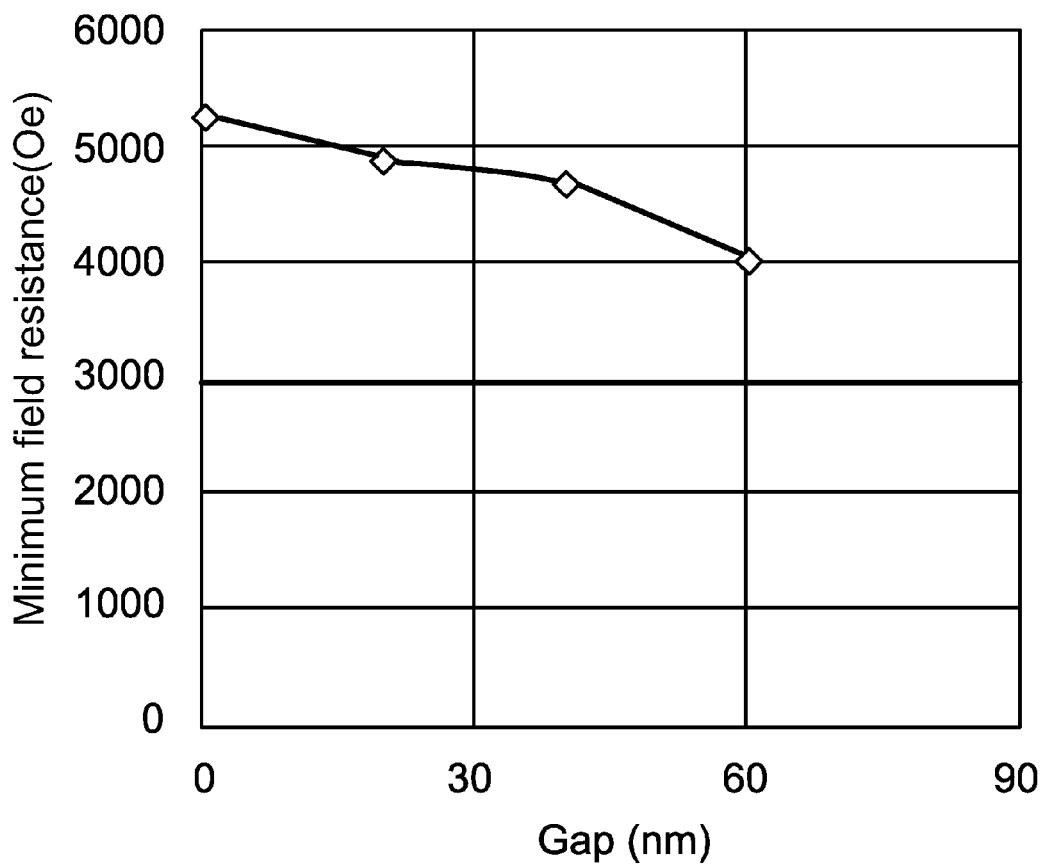
FIG. 11 is a graph showing a flare angle start position and external magnetic field resistance, according to one embodiment.

The start position and the effect of embodiments described herein were also confirmed. FIG. 11 shows an external magnetic field resistance of the magnetic-domain-control film with respect to flare start position. It is seen from FIG. 11 that even when the gap length is about 40 nm, the effect of the flare shape may still be observed, and this effect may be anticipated up to a gap length of about 60 nm. From these results, the flare start position may be no greater than 60 nm in order to obtain greater results.

It should be noted that methodology presented herein for at least some of the various embodiments may be implemented, in whole or in part, in computer hardware, software, by hand, using specialty equipment, etc. and combinations thereof.

Figure 7B:
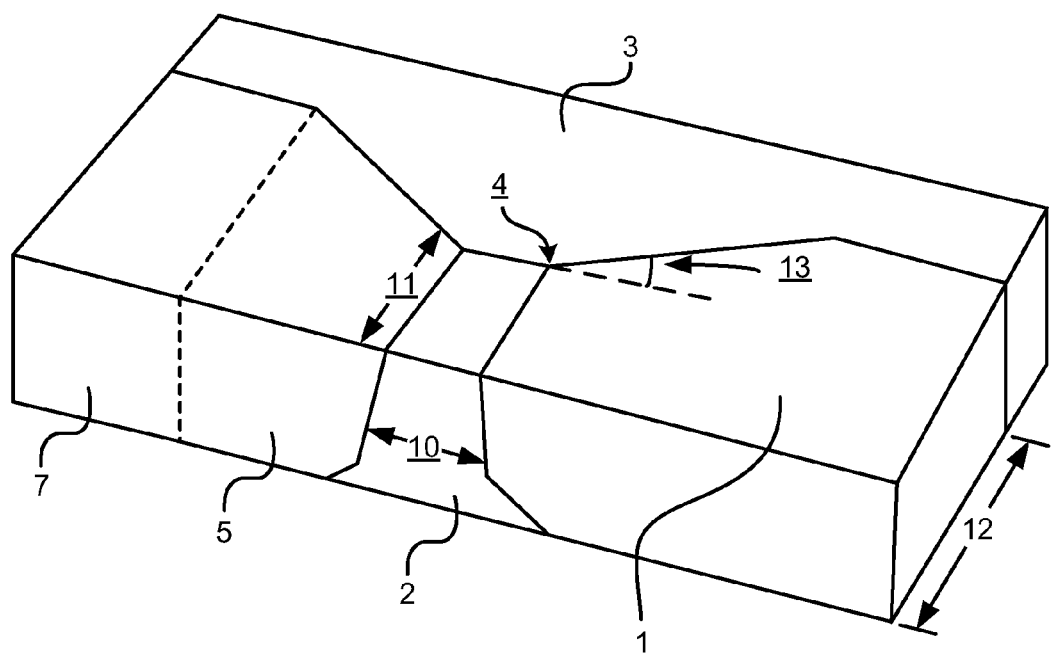
FIG. 7B shows a schematic diagram of a magnetic-domain-control film according to one embodiment.

Referring now to FIGS. 7B and 10, according to various embodiments, a magnetic sensor comprises a read element 2 and a magnetic-domain-control film 1 positioned on both sides of the read element in a cross-track direction. The magnetic-domain-control film has a flare shape which causes the magnetic-domain-control film to flare away in an element height direction from the depthwise end of the read element 4 and extending in both directions away from the read element in a cross-track direction.

In a further embodiment, the flare shape may cause portions of the magnetic-domain-control film positioned farther from the read element to have a greater height 12 in an element height direction than a height 11 of portions of the magnetic-domain-control film positioned nearer to the read element.

In other embodiments, referring to FIG. 7B, the flare shape, on both sides of the read element in a cross-track direction, may be defined by an end portion 7 of the magnetic-domain-control film, that has a depthwise end that is about parallel with a depthwise end of the read element that has a height 12 different than the height 11 of the read element 2, and a flared end portion 5 of the magnetic-domain-control film, extending between the end portion and the read element, that has a depthwise end that is angled (per the flare angle 13) relative to the depthwise end of the read element.

In a further embodiment, the flare angle 13 of the flare shape may be in a range from about 30° to about 60°, the flare angle being measured at the flare start position 4 where a line extending from the depthwise end of the read element intersects with the depthwise end of the flared end portion of the magnetic-domain-control film.

In another embodiment, referring to FIG. 10, the flare shape, on both sides of the read element in a cross-track direction, may comprise a starting portion 6 of the magnetic-domain-control film, positioned adjacent the read element, that has a depthwise end that is about parallel with a depthwise end of the read element, an end portion 7 of the magnetic-domain-control film that has a depthwise end that is about parallel with the depthwise end of the read element, and a flared end portion 5 of the magnetic-domain-control film, extending between the starting portion and the end portion, that has a depthwise end that is angled relative to the depthwise end of the read element.

In a further embodiment, the flare angle 13 of the flare shape may be in a range from about 30° to about 60°, the flare angle being measured at the flare start position 4 where a line extending from the depthwise end of the read element intersects with the depthwise end of the flared end portion of the magnetic-domain-control film.

Furthermore, the flare shape may cause a gap length 14 distance along the depthwise end of the starting portion of the magnetic-domain-control film, on both sides of the read element in the cross-track direction, to be no greater than about 60 nm, wherein the flare start position 4 is positioned where a line extending from the depthwise end of the read element intersects with the depthwise end of the flared end portion of the magnetic-domain-control film.

In more approaches, a depthwise length 12 (hPM) at an end portion of the magnetic-domain-control film may be about 1.2 to about 2.0 times a depthwise length 11 (SH) of the read element measured at a portion of the magnetic-domain-control film beyond a flared portion thereof, from the read element, in a cross-track direction.

In more approaches, the magnetic-domain-control film may comprise Co, Fe, Pt, or an alloy comprising one or more of Co, Fe, and Pt.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic sensor, comprising:
   a read element; and
   a magnetic-domain-control film positioned on both sides of the read element in a cross-track direction,
   wherein the magnetic-domain-control film has a flare shape which causes the magnetic-domain-control film to flare away in an element height direction from a depthwise end of the read element and extending in both directions away from the read element in the cross-track direction,
   wherein the flare shape comprises a starting portion of the magnetic-domain-control film positioned adjacent the read element, the starting portion having a depthwise end that is about parallel with a depthwise end of the read element,
   wherein a length of the starting portion in the cross-track direction is less than about 60 nm,
   wherein a depthwise length (hPM) at an end portion of the magnetic-domain-control film is about 1.2 to about 2.0 times a depthwise length (SH) of the read element, and
   wherein the read element has a width in the cross-track direction at an air bearing surface (ABS) thereof that changes along a track direction that is oriented perpendicular to the cross-track direction.

2. The magnetic sensor as recited in claim 1, wherein the flare shape causes portions of the magnetic-domain-control film positioned farther from the read element to have a greater height in the element height direction than portions of the magnetic-domain-control film positioned nearer to the read element.

3. The magnetic sensor as recited in claim 1, wherein the read element has a shape at the ABS thereof that comprises:
   a lower portion characterized by lower sides which slant toward each other along a direction from a bottom of the read element toward a top of the read element at a first angle; and
   an upper portion characterized by upper sides which slant away from each other along a direction from the top of the read element toward the bottom of the read element at a second angle.

4. The magnetic sensor as recited in claim 1, wherein the flare shape, on both sides of the read element in the cross-track direction, further comprises:
   an end portion of the magnetic-domain-control film that has a depthwise end that is about parallel with the depthwise end of the read element; and
   a flared end portion of the magnetic-domain-control film, extending between the starting portion and the end portion, that has a depthwise end that is angled relative to the depthwise end of the read element.

5. The magnetic sensor as recited in claim 4, wherein a flare angle of the flare shape is in a range from about 30° to about 60°, the flare angle being measured at a flare start position where a line extending from the depthwise end of the read element intersects with the depthwise end of the flared end portion of the magnetic-domain-control film.

6. The magnetic sensor as recited in claim 4, wherein the flare shape causes a gap length distance along the depthwise end of the starting portion of the magnetic-domain-control film, on both sides of the read element in the cross-track direction, to be no greater than about 60 nm, wherein a flare start position is positioned where a line extending from the depthwise end of the read element intersects with the depthwise end of the flared end portion of the magnetic-domain-control film.

7. The magnetic sensor as recited in claim 4, wherein the length of the starting portion in the cross-track direction is less than about 40 nm.

8. The magnetic sensor as recited in claim 1, wherein a flare angle of the flare shape is in a range from about 30° to about 60°, the flare angle being measured at a flare start position where a line extending from the depthwise end of the read element intersects with a depthwise end of a flared end portion of the magnetic-domain-control film.

9. The magnetic sensor as recited in claim 1, wherein the magnetic-domain-control film comprises: Co, Fe, Pt, or an alloy comprising one or more of Co, Fe, and Pt.

10. A magnetic data storage system, comprising:
at least one magnetic head comprising a magnetic sensor as recited in claim 1;
a magnetic medium;
a drive mechanism for passing the magnetic medium over the at least one magnetic head; and
a controller electrically coupled to the at least one magnetic head for controlling operation of the at least one magnetic head.

11. A method for forming a magnetic sensor, the method comprising:
forming a read element having a width in a cross-track direction at an air bearing surface (ABS) thereof that changes along a track direction that is oriented perpendicular to the cross-track direction; and
forming a magnetic-domain-control film positioned on both sides of the read element in the cross-track direction,
wherein the magnetic-domain-control film has a flare shape which causes the magnetic-domain-control film to flare away in an element height direction from a depthwise end of the read element and extending in both directions away from the read element in the cross-track direction,
wherein the flare shape comprises a starting portion of the magnetic-domain-control film positioned adjacent the read element, the starting portion having a depthwise end that is about parallel with a depthwise end of the read element,
wherein a length of the starting portion in the cross-track direction is less than about 60 nm,
wherein a depthwise length (hPM) at an end portion of the magnetic-domain-control film is about 1.2 to about 2.0 times a depthwise length (SH) of the read element.

12. The method as recited in claim 11, wherein the flare shape causes portions of the magnetic-domain-control film positioned farther from the read element to have a greater height in an element height direction than portions of the magnetic-domain-control film positioned nearer to the read element.

13. The method as recited in claim 11, wherein the read element has a shape at the ABS thereof that comprises:
a lower portion characterized by lower sides which slant toward each other along a direction from a bottom of the read element toward a top of the read element at a first angle; and
an upper portion characterized by upper sides which slant away from each other along a direction from the top of the read element toward the bottom of the read element at a second angle.

14. The method as recited in claim 11, wherein the flare shape, on both sides of the read element in the cross-track direction, further comprises:
an end portion of the magnetic-domain-control film that has a depthwise end that is about parallel with the depthwise end of the read element; and
a flared end portion of the magnetic-domain-control film, extending between the starting portion and the end portion, that has a depthwise end that is angled relative to the depthwise end of the read element.

15. The method as recited in claim 14, wherein the flare shape causes a gap length distance along the depthwise end of the starting portion of the magnetic-domain-control film, on both sides of the read element in the cross-track direction, to be no greater than about 60 nm, wherein a flare start position is positioned where a line extending from the depthwise end of the read element intersects with the depthwise end of the flared end portion of the magnetic-domain-control film.

16. The method as recited in claim 14, wherein the length of the starting portion in the cross-track direction is less than about 40 nm.

17. The method as recited in claim 11, wherein a flare angle of the flare shape is in a range from about 30° to about 60°, the flare angle being measured at a flare start position where a line extending from the depthwise end of the read element intersects with a depthwise end of a flared end portion of the magnetic-domain-control film.

18. The method as recited in claim 11, wherein the magnetic-domain-control film comprises: Co, Fe, Pt, or an alloy comprising one or more of Co, Fe, and Pt.

19. A magnetic sensor, comprising:
a read element having a width in a cross-track direction at an air bearing surface (ABS) thereof that changes along a track direction that is oriented perpendicular to the cross-track direction; and
a magnetic-domain-control film positioned on both sides of the read element in the cross-track direction, the magnetic-domain-control film having a flare shape which causes the magnetic-domain-control film to flare away in an element height direction from a depthwise end of the read element and extending in both directions away from the read element in the cross-track direction,
wherein the flare shape causes portions of the magnetic-domain-control film positioned farther from the read element to have a greater height in the element height direction than portions of the magnetic-domain-control film positioned nearer to the read element, and
wherein the flare shape, on both sides of the read element in the cross-track direction, is defined by three different portions:
a starting portion of the magnetic-domain-control film, positioned adjacent the read element, that has a depthwise end that is about parallel with a depthwise end of the read element, wherein a length of the starting portion in the cross-track direction is less than about 60 nm;
an end portion of the magnetic-domain-control film that has a depthwise end that is about parallel with the depthwise end of the read element; and a flared end portion of the magnetic-domain-control film, extending between the starting portion and the end portion, that has a depthwise end that is angled relative to the depthwise end of the read element.

* * * * *